United States Patent [19]

Stoss et al.

[11] Patent Number: 5,954,026
[45] Date of Patent: Sep. 21, 1999

[54] PROCESS AND DEVICE FOR REDUCING LOAD CHANGE STRESSES IN A MOTOR VEHICLE

[75] Inventors: Peter Stoss, Forst; Hong Zhang, Regensburg, both of Germany

[73] Assignee: Robert Bosch GmbH, Stuttgart, Germany

[21] Appl. No.: 09/051,109

[22] PCT Filed: Jul. 20, 1996

[86] PCT No.: PCT/DE96/01332

§ 371 Date: Apr. 6, 1998

§ 102(e) Date: Apr. 6, 1998

[87] PCT Pub. No.: WO97/14886

PCT Pub. Date: Apr. 24, 1997

[30] Foreign Application Priority Data

Oct. 14, 1995 [DE] Germany .......................... 195 38 369

[51] Int. Cl.[6] .............................. F02P 5/15; F02D 17/00
[52] U.S. Cl. ...................... 123/406.24; 123/481; 701/111
[58] Field of Search ........................ 123/406.23, 406.24, 123/198 F, 481, 436; 701/111

[56] References Cited

U.S. PATENT DOCUMENTS

| 4,535,406 | 8/1985 | Johnson .................................... 701/111 |
| 4,928,652 | 5/1990 | Shinya et al. .................. 123/406.24 X |
| 5,452,698 | 9/1995 | Denz et al. ......................... 123/406.24 |
| 5,481,461 | 1/1996 | Miyamoto et al. ................. 123/481 X |
| 5,558,178 | 9/1996 | Hess et al. .............................. 180/197 |
| 5,573,474 | 11/1996 | Marsh et al. ........................ 477/111 X |
| 5,669,354 | 9/1997 | Morris ................................. 123/406.24 |

*Primary Examiner*—Tony M. Argenbright
*Attorney, Agent, or Firm*—Kenyon & Kenyon

[57] ABSTRACT

In order to damp shocks due to load alterations to as great an extent as possible, indexed base torque of the engine is determined which corresponds to a coupling torque able to be tapped off at the engine crankshaft and not reduced by engine loss torques. The indexed base torque is then converted by filtering into an indexed setpoint torque which exhibits a smaller rise compared to the indexed base torque in response to a load alteration. Finally, a setpoint ignition angle is derived from the an indexed setpoint torque.

7 Claims, 1 Drawing Sheet

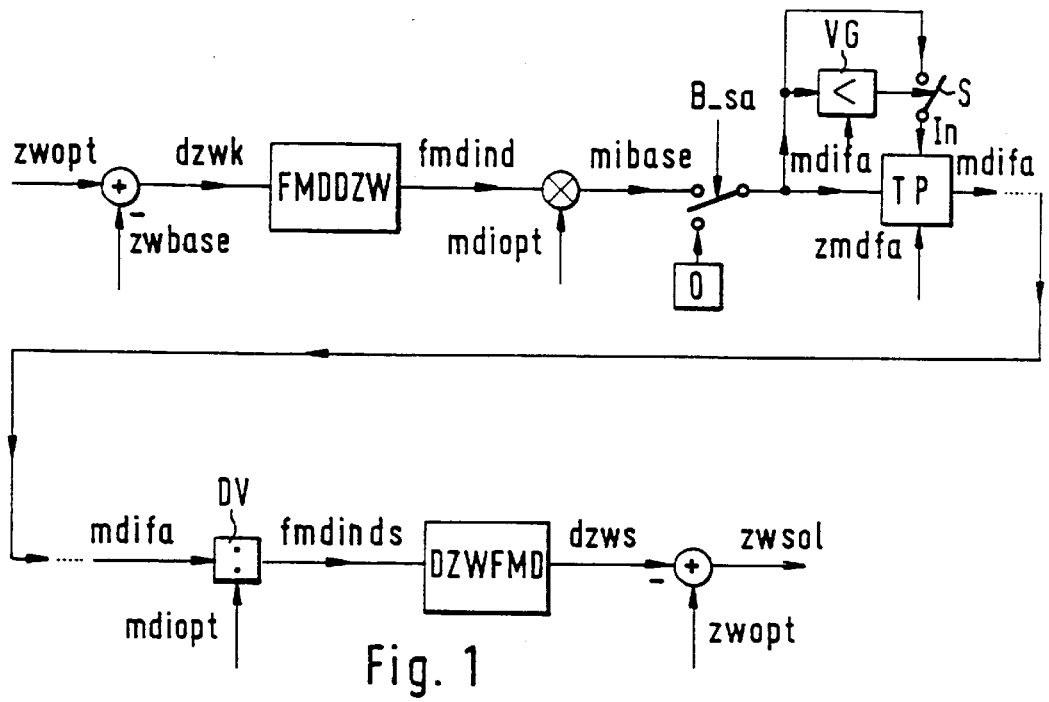
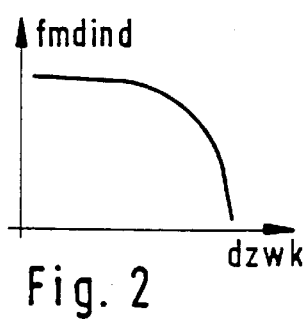
Fig. 2
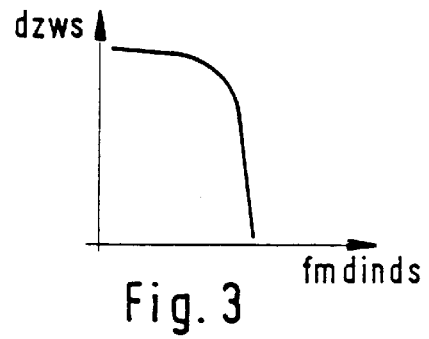
Fig. 3
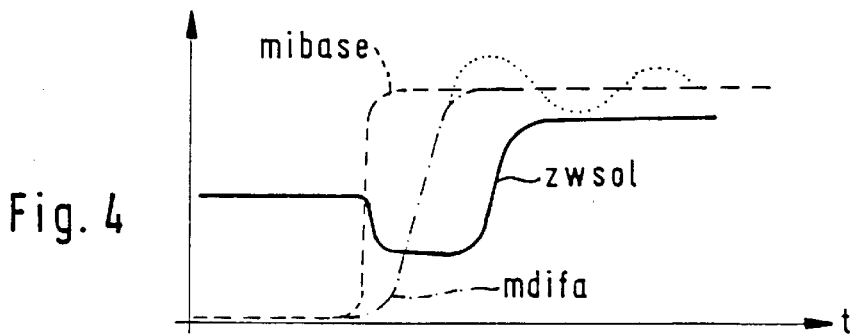
Fig. 4

PROCESS AND DEVICE FOR REDUCING LOAD CHANGE STRESSES IN A MOTOR VEHICLE

FIELD OF THE INVENTION

The present invention relates to a method and an arrangement for reducing shocks due to load alterations in a motor vehicle, specifically a torque correction of the internal combustion engine being carried out by controlling the ignition angle in an open loop.

BACKGROUND OF THE INVENTION

When a vehicle driven by an internal combustion engine is accelerated by the quick opening of the throttle valve, there is often an uncomfortable load-alteration shock for the passengers and ignition angle in order to dump vehicle vibrations during acceleration or juddering motions of the vehicle during sationery operation. In so doing, a correction value for the ignition angle is determined as a function of the change in the engine speed, so that the change in torque following from it is in phase opposition to the juddering vibration of the vehicle.

SUMMARY OF THE INVENTION

An object of the present invention is to specify a method and an arrangement, respectively, which allow a further improvement in the damping of shocks due to load alterations.

According to the present invention, the indexed base torque of the engine is determined which corresponds to the coupling torque able to be tapped off at the engine crankshaft and not reduced by engine loss torques. The indexed base torque is then converted by filtering into an indexed setpoint torque exhibiting a smaller rise compared to the base torque in response to a load alteration. Finally, a setpoint ignition angle realizing the indexed setpoint torque is derived from the setpoint torque. The setpoint ignition angle is derived from an indexed setpoint torque because an ignition-angle intervention mainly influences the indexed engine torque, and secondarily influences the engine loss torques. A setpoint ignition angle thus determined acts directly, and thus in a more strongly damping manner, on load-alteration shocks.

According to the present invention, a second-order delay element is used for filtering the indexed base torque, because the indexed setpoint torque resulting therefrom assures optimal damping of the loadalteration shocks.

BRIEF DESCRIPTION OF THE DRAWINGS

FIG. 1 shows an exemplary block diagram for deriving a setpoint ignition angle according to the present invention.

FIG. 2 shows a typical characteristic curve representing the dependency of a torque-correction factor of an adjustment of the ignition angle.

FIG. 3 shows a typical characteristic curve inverse to the dependency of a torque-correction factor on an adjustment of the ignition angle shown in FIG. 2.

FIG. 4 shows exemplary torque and ignition-angle chracteristics.

DETAILED DESCRIPTION

The block diagram in FIG. 1 shows that a difference is formed between an optimal ignition angle zwopt and the active ignition angle zwbase unchanged by an intervention.

The optimal ignition angle zwopt is inferred from an engine characteristics map, not shown, which is a function of the load and speed, where the optimal ignition angle corresponds to an optimal engine efficiency. In the same way, the active ignition angle zwbase can be gathered from a characteristics map which is a function of the load and speed. This ignition-angle difference dzwk, the amount of deviation of the active ignition angle zwbase with respect to the optimal ignition angle zwopt, is fed to a circuit block FMDDZW. In circuit block FMDDZW is a correction characteristic, shown in FIG. 2, which represents the relationship between a correction factor fmdind for an optimal, indexed engine torque mdiopt corresponding to the optimal engine efficiency, and the ignition-angle difference dzwk. The appertaining correction factor fmdind for the specific ignition-angle difference dzwk input into circuit block FMDDZW is gathered from this characteristic. The optimal, indexed engine torque mdiopt, which like the optimal ignition angle zwopt, can be gathered from a characteristics map which is a function of the load and speed, is multiplied by this correction factor fmdind. The result of the multiplication of optimal indexed engine torque mdiopt by correction factor fmdind is the indexed base torque mibase of the engine. Thus, indexed base torque mibase is the indexed engine torque arising because of the deviation of active ignition angle zwbase from optimal ignition angle zwopt. The indexed torque is the engine torque which results directly from the combustion and is not reduced by either a drag torque or further load torques. The drag torque of the engine is a loss torque caused by the mass of the drive unit, and can be determined from a map which is a function of the engine speed and the engine temperature. The load torques can be gathered from a map as a function of the operating states of additional aggregates such as air conditioning, steering system, transmission, etc. Thus, the indexed engine torque is the sum of the coupling torque occurring at the crankshaft, the drag torque and possibly further load torques. The derivation of the indexed base torque mibase described above is also described in German Patent No. DE 42 39 711 A1, and is designated there as combustion torque.

Indexed base torque mibase is switched through to a filter TP, provided that a condition of deceleration fuel cutoff B_sa does not exist. Filter TP is preferably a second-order delay element. The filtering of indexed base torque mibase results in an indexed setpoint torque mdifa. FIG. 4 shows the characteristic curves over time of indexed base torque mibase and indexed setpoint torque mdifa. Indexed base torque mibase rises abruptly in response to a load alteration. Due to the second-order delay element, initially indexed setpoint torque mdifa maintains a gradual build-up in response to the load alteration, and then runs quickly toward the value of the indexed engine torque corresponding to the driver command. The transfer function of the filter would actually lead to the overshoots and undershoots of the curve of indexed setpoint torque mdifa indicated with a dotted line in FIG. 4.

The undershoots are especially unwanted. Therefore, filter TP is deactivated as soon as indexed setpoint torque mdifa exceeds indexed base torque mibase. For this purpose, filter TP has an activation input In. Used as the activation signal is indexed base torque mibase which is fed via a switch S to activation input In as long as indexed setpoint torque mdifa appearing at the output of filter TP is still less than indexed base torque mibase. A comparative circuit VG performs the comparison between indexed setpoint torque mdifa and indexed base torque mibase. As soon as comparative circuit VG determines that indexed setpoint torque mdifa exceeds indexed base torque mibase, switch S is opened. No signal is then applied at activation input In, and filter TP is no longer active, so that its output signal mdifa equals indexed base torque mibase.

Filter TP has a variable rise-time constant zmdfa, in order to be able to adjust the rise time of indexed setpoint torque mdifa as a function of the respective gear speed selected. And indeed, time constant zmdfa for the filtering becomes smaller with increasing gear; for example, if first gear is selected, time constant zmdfa is 0.3 sec, and given the highest selected gear, it is 0.01 sec.

Using indexed setpoint torque mdifa, a setpoint ignition angle zwsol realizing the torque is now derived in the following manner. The ratio from indexed setpoint torque mdifa, determined before, and optimal indexed engine torque mdiopt is formed in a divider DV. Correction factor fmdinds resulting therefrom is fed to a circuit block DZWFMD, where a characteristic curve is realized, shown in FIG. 3. In this case, it is a correction characteristic representing the dependence of an ignition-angle change dzws on torque-correction factor fmdinds. This correction characteristic in circuit block DZWFMD is inverse to the correction characteristic in circuit block FMDDZW. Thus circuit block DZWFMD, as a function of torque-correction factor fmdinds, generates an output signal dzws which indicates the difference between optimal ignition angle zwopt corresponding to optimal indexed engine torque mdiopt, and a setpoint ignition angle zwsol corresponding to indexed setpoint torque mdifa. The desired optimal ignition angle zwopt results finally from the difference formation between optimal ignition angle zwopt and ignition-angle difference dzws. This setpoint ignition angle zwsol causes indexed setpoint torque mdifa to adjust itself, which reduces shocks due to load alterations to a great extent. Shown in FIG. 4 by way of example is a curve over time of setpoint ignition angle zwsol after a load alteration.

Instead of, or in addition to the setpoint ignition angle, a setpoint number of cylinder suppressions can also be determined, from which the previously described, indexed setpoint-torque results.

What is claimed is:

1. A method for correcting a torque of an internal combustion engine by controlling an ignition angle in an open loop for reducing shocks due to load alterations in a motor vehicle, comprising the steps of:

determining an indexed base torque of the internal combustion engine resulting from a combustion;

filtering the indexed base torque for converting the indexed base torque into an indexed setpoint torque, wherein the indexed setpoint torque exhibits a smaller rise than the indexed base torque in response to a load alteration; and deriving at least one of a setpoint ignition angle and a setpoint number of cylinder suppressions from the indexed setpoint torque.

2. The method according to claim 1, further comprising the steps of:

determining an optimal ignition angle corresponding to an optimal engine efficiency from a characteristics map, wherein the characteristics map is a function of a load and a speed;

forming a first ignition angle difference between the optimal ignition angle and an active ignition angle;

gathering a first correction factor allocated to the first ignition angle difference from a first correction characteristic, wherein the first correction characteristic represents a relationship between the first correction factor for an optimal indexed engine torque corresponding to the optimal engine efficiency, and the first ignition angle difference; and multiplying the optimal indexed engine torque and the first correction factor to determine the indexed base torque.

3. The method according to claim 1, wherein the filtering of the indexed base torque includes a low-pass filtering.

4. The method according to claim 1 or 3, further comprising the step of deactivating the filtering of the indexed base torque when a value of the indexed setpoint torque exceeds a value of the indexed base torque.

5. The method according to claim 1 or 3, wherein the filtering has a variable rise-time constant which is adjusted as a function of a gear speed.

6. The method according to claim 1 and 2, further comprising the steps of:

forming a second correction factor using a ratio of the indexed setpoint torque and the optimal indexed engine torque;

gathering a second ignition angle difference allocated to the second correction factor using a second correction characteristic, wherein the second correction characteristic is inverse to the first correction characteristic and represents a relationship between the second correction factor and the second ignition angle difference; and determining the setpoint ignition angle by subtracting the second ignition angle difference from the optimal ignition angle.

7. An arrangement for carrying out a torque correction of an internal combustion engine by controlling an ignition angle in an open loop for reducing load alterations due to shocks in a motor vehicle, comprising:

a first circuit block for determining an indexed base torque of the internal combustion engine resulting from a combustion;

a filter for converting the indexed base torque into an indexed setpoint torque, wherein the indexed setpoint torque exhibits a smaller rise than the indexed base torque in response to a load alteration; and a second circuit block for deriving a setpoint ignition angle from the indexed setpoint torque.

\* \* \* \* \*

UNITED STATES PATENT AND TRADEMARK OFFICE
CERTIFICATE OF CORRECTION

PATENT No. : 5,954,026

DATED : September 21, 1999

INVENTOR(S): Peter Stoss

It is certified that error appears in the above-identified patent and that said Letters Patent is hereby corrected as shown below:

Title page, Abstract, line 2, after "possible" insert - - an - -.

Column 1, lines 17-20, delete "ignition angle in order*****value for the ignition angle" and insert - - a subsequent jerking of the vehicle. According to German Patent No. DE 40 21 444 A1, a torque correction of the engine is carried out through an open-loop control of the ignition angle in order to damp vehicle vibrations during accceleration or juddering motions of the vehicle during stationary operation. In so doing, a correction value for the ignition angle - - .

Signed and Sealed this

Twenty-seventh Day of March, 2001

*Attest:*

NICHOLAS P. GODICI

*Attesting Officer*   *Acting Director of the United States Patent and Trademark Office*